(12) United States Patent
Suzuki et al.

(10) Patent No.: US 7,328,873 B2
(45) Date of Patent: Feb. 12, 2008

(54) PIPE CLAMP

(75) Inventors: Keisuke Suzuki, Utsunomiya (JP); Akihiko Tanno, Fujisawa (JP)

(73) Assignee: Nifco Inc., Yokohama (JP)

( * ) Notice: Subject to any disclaimer, the term of this patent is extended or adjusted under 35 U.S.C. 154(b) by 431 days.

(21) Appl. No.: 10/986,276

(22) Filed: Nov. 12, 2004

(65) Prior Publication Data
US 2005/0127248 A1 Jun. 16, 2005

(30) Foreign Application Priority Data
Nov. 25, 2003 (JP) ............................ 2003-393752

(51) Int. Cl.
*F16L 3/22* (2006.01)
(52) U.S. Cl. .................. 248/68.1; 248/71; 248/73; 248/74.1; 248/74.2; 248/55
(58) Field of Classification Search .............. 248/65, 248/68.1, 71, 73, 74.2
See application file for complete search history.

(56) References Cited

U.S. PATENT DOCUMENTS 7,011,277 B2 * 3/2006 Mizukoshi et al. ........ 248/68.1
7,036,775 B2 * 5/2006 Nakanishi .................. 248/68.1
7,086,630 B2 * 8/2006 Maruyama ................. 248/71
2002/0066835 A1 * 6/2002 Sentpali et al. ............ 248/68.1

FOREIGN PATENT DOCUMENTS

| JP | 2552191 | 7/1997 |
| JP | 10-061830 | 3/1998 |
| JP | 2002-295585 | 10/2002 |

* cited by examiner

*Primary Examiner*—Amy J. Sterling
(74) *Attorney, Agent, or Firm*—Manabu Kanesaka

(57) ABSTRACT

A pipe clamp for attaching a pipe to a fixing member includes a connecting portion formed of a hard material, a pipe holding portion formed of a hard material, and a vibration-proof member formed of a soft material and disposed between the connecting portion and the pipe holding portion. The vibration-proof member is provided with an engaging portion for engaging the connecting portion and another engaging portion for engaging the pipe holding portion. The vibration-proof member is provided with a plurality of grooves or projections arranged along an axial direction of the pipe on at least one of surfaces facing the connecting portion and the pipe holding portion.

8 Claims, 2 Drawing Sheets

PIPE CLAMP

BACKGROUND OF THE INVENTION AND RELATED ART STATEMENT

The invention relates to a pipe clamp for attaching a specific portion of a pipe in which fuel or break fluid flows to a floor panel of an automobile, a wall of an engine room, and the like.

When a pipe in which fuel or break fluid flows with pulsating is installed on a floor panel of an automobile, a wall of an engine room, and the like, a pipe clamp formed of a synthetic resin is used for attaching a specific portion of the pipe. It is preferred that such a pipe clamp is easy to install and has a strong holding force. Further, the pipe clamp preferably has a structure in which sound or vibration is not transmitted to a car body.

In order to increase a force for holding a pipe, the pipe clamp is preferably formed of a hard material with relatively high rigidity. On the other hand, in order to improve the vibration-proof property, the pipe clamp is preferably formed of a soft material with high elasticity. Japanese Patent Publication (Kokai) No. 2002-295585 has disclosed a clamp with high vibration-proof property to meet such a trade-off property. In the clamp, a housing to be attached to a car body is formed of a hard material, and a pipe holding portion for holding a pipe is formed of a soft material.

In the conventional pipe clamp, in order to hold a plurality of pipes, it is necessary to provide a plurality of pipe holding portions corresponding to the number of pipes in a single housing. Accordingly, the number of parts and manufacturing steps increase in proportion to the number of pipes.

In view of the problems described above, an object of the present invention is to provide a pipe clamp having a high holding force and good vibration-proof property without increasing the number of parts and manufacturing steps.

Further objects and advantages of the invention will be apparent from the following description of the invention.

SUMMARY OF THE INVENTION

In order to attain the objects described above, according to the present invention, a pipe clamp for attaching a pipe to a member includes a connecting portion formed of a hard material, a pipe holding portion formed of a hard material, and a vibration-proof member formed of a soft material and disposed between the connecting portion and the pipe holding portion. The vibration-proof member is provided with a first engaging portion for engaging the connecting portion and a second engaging portion for engaging the pipe holding portion.

According to the present invention, the pipe clamp is structured such that when the vibration-proof member is attached to the connecting portion and the pipe holding portion, the connecting portion and the pipe holding portion move relatively each other along an axial direction of a pipe to be attached.

According to the present invention, the vibration-proof member is provided with a plurality of grooves or projections arranged along the axial direction of the pipe on at least one of surfaces facing the connecting portion and the pipe holding portion.

In the structure described above, a portion to be attached to the member and a portion for holding the pipe are formed of a hard material. The vibration-proof member formed of a soft material is disposed between the portions. Accordingly, it is possible to obtain a high holding force and good vibration-proof property. Further, even if the number of the pipes to be held increases, the number of parts does not change. Accordingly, it is possible to prevent an increase in the number of parts and manufacturing steps. When the three parts relatively move along the axial direction of the pipe to assemble the three parts, it is possible to reduce frictional resistance with the grooves or projections extending along the moving direction, thereby making it easy to assemble the three parts. Accordingly, it is possible to provide the pipe clamp having a high holding force and good vibration-proof property without increasing the number of parts and manufacturing steps.

DETAILED DESCRIPTION OF PREFERRED EMBODIMENTS

Figure 1:
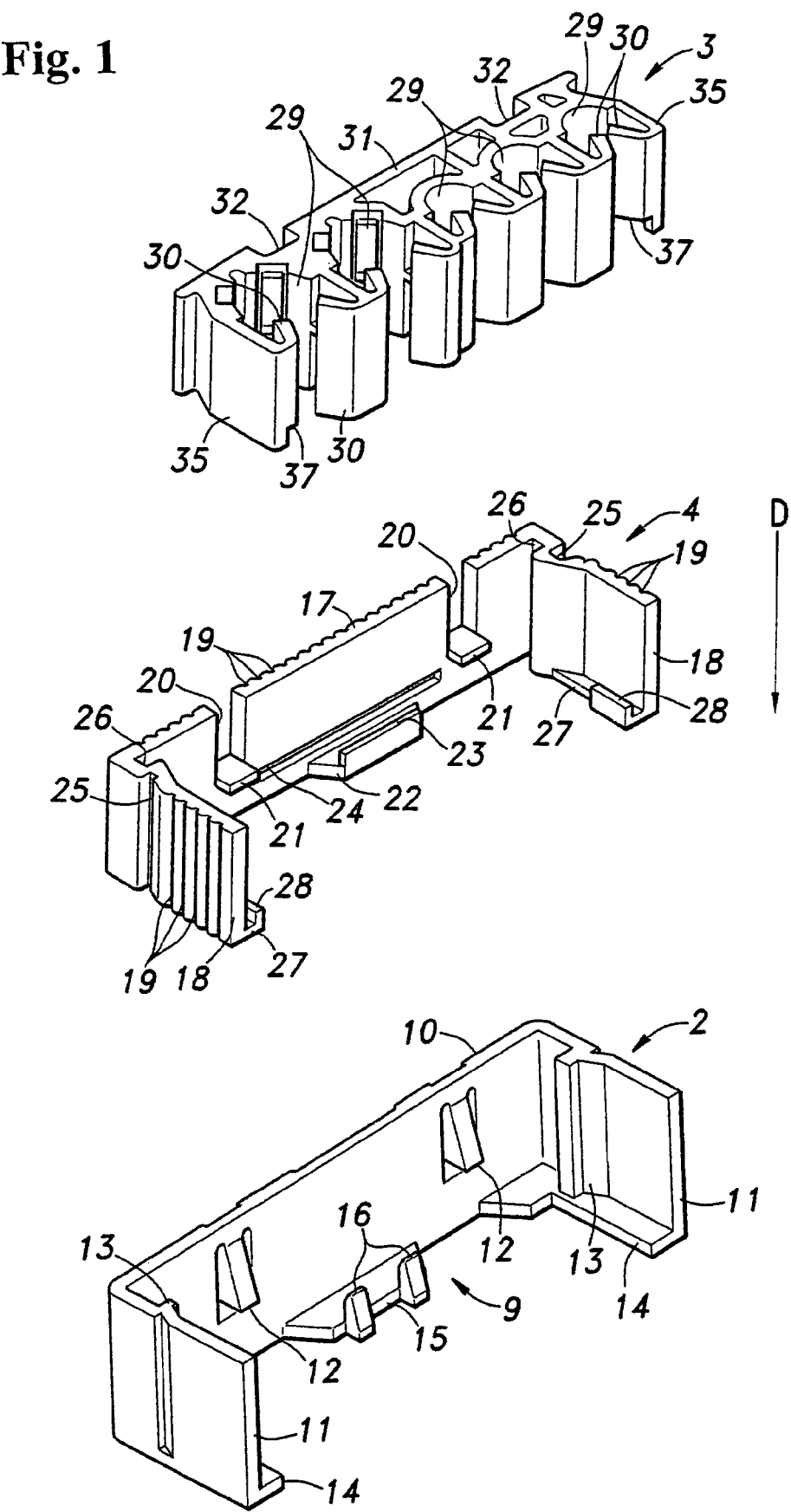
FIG. 1 is an exploded perspective view showing a pipe clamp according to an embodiment of the present invention.
Figure 2:
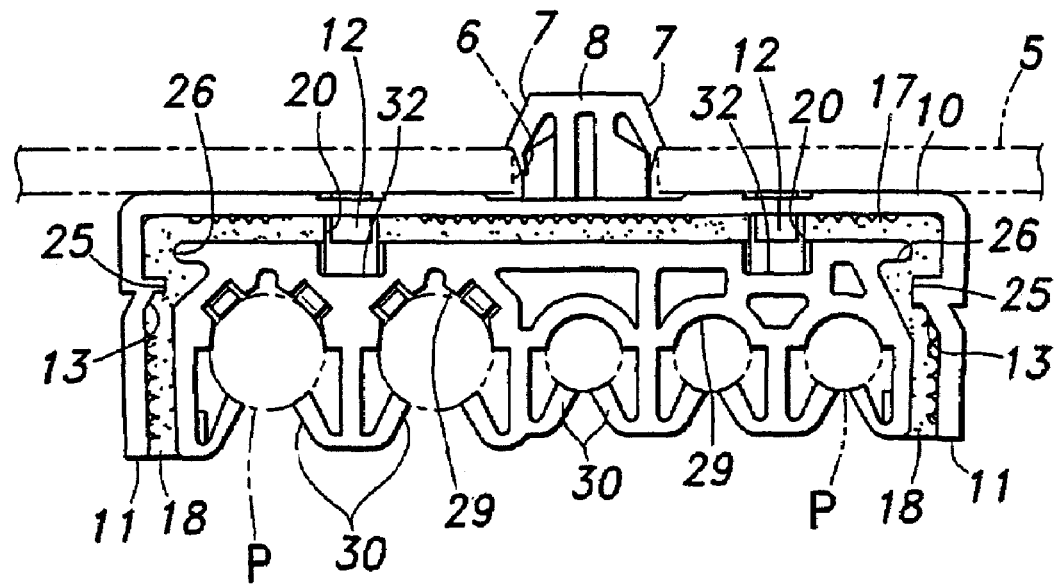
FIG. 2 is a plan view of the pipe clamp in an assembled state.

Hereunder, embodiments of the present invention will be explained with reference to the accompanying drawings. A pipe clamp 1 is formed of three portions, namely a connecting portion 2 and a pipe holding portion 3 both formed of a relatively hard synthetic resin such as polyacetal (POM), and a vibration-proof member 4 formed of a soft material such as ethylene-propylene terpolymer (EPDM). The three parts move relatively with each other along an axial direction of a pipe to be held, and are connected with each other (see an arrow D in FIG. 1).

The connecting portion 2 (portion to be connected to a car body) includes an anchor portion 8 to be inserted into a rectangular hole 6 formed in a metal plate 5 of a car body for engaging an opening edge of the rectangular hole 6 with elastic craws 7 formed on both sides thereof. The connecting portion 2 also includes a housing portion 9 for retaining the pipe holding portion 3 with the vibration-proof member 4 in between. In the flowing description, a side where the anchor portion 8 is provided is designated as an upper side for the sake of explanation.

The housing portion 9 includes an upper wall 10 having an elongated rectangular shape extending in the left-to-right direction, and sidewalls 11 with a substantially square shape extending downwardly from left and right ends of the upper wall 10. The upper wall 10 is provided with elastic craws 12 at left and right sides of the anchor portion 8 for holding the pipe holding portion 3 and the vibration-proof member 4 attached to the housing portion 9. The sidewalls 11 are provided with projections 13 having a substantially rectangular cross section on upper sides of inner surfaces thereof.

Ribs 14 having an L shape are formed between left and right ends of a rear edge of the upper wall 10 and rear edges of the sidewalls 11 of the housing portion 9. A rib 15 having a trapezoid shape is formed on the rear edge of the upper wall 10 at a center thereof. Projections 16 projecting forward are formed on a lower edge of the rib 15 at left and right sides thereof.

The vibration-proof member 4 includes an upper wall 17 and sidewalls 18 corresponding to the upper wall 10 and the sidewalls 11 of the housing portion 9, respectively. A plurality of grooves 19 is formed in outer surfaces of the vibration-proof member 4, and extends along the front-torear direction, i.e. a direction that the vibration-proof member 4 moves to be assembled to the housing portion 9. Cut portions 20 are formed in the upper wall 17 at left and right sides thereof and separated with each other. The cut portions 20 have a rectangular shape extending in the front-to-rear direction, and front edges thereof are open. Projections 21 projecting downwardly are formed at rear edges of the cut portions 20.

A rib 22 having a trapezoid shape extends from a rear edge of the upper wall 17, and is formed on a lower portion of the upper wall 17 of the vibration-proof member 4 between the cut portions 20. A projection 23 projecting forward is formed on a lower edge of the rib 22. A groove 24 extending in the left-to-right direction along a base portion of the rib 22 is formed on the lower portion of the upper wall 17 between the cut portions 20.

Grooves 25 having a substantially rectangular cross section and extending in the front-to-rear direction are formed in outer surfaces of the sidewalls 18 at upper portions thereof. The grooves 25 correspond to the projections 13 formed on the inner surfaces of the sidewalls 11 of the housing portion 9. The upper portions of the sidewalls 18 project inwardly to form the grooves 25, and grooves 26 extending in the front-to-rear direction are formed with the projections at connecting portions between the upper wall 17 and the sidewalls 18 of the vibration-proof member 4. Ribs 27 projecting inwardly are formed on rear edges of the sidewalls 18 of the vibration-proof member 4. Projections 28 projecting forward are formed on lower inner edges of the ribs 27.

The pipe holding portion 3 includes a plurality (five in the embodiment) of pipe holding parts 29 having a U shape with an opening facing a lower side and arranged in a row in the left-to-right direction. A pair of elastic pieces 30 is formed at opening edges of each of the pipe holding parts 29, and extends upwardly from the opening edges toward inside. When a pipe P is inserted in the pipe holding part 29, the elastic pieces 30 expand free ends thereof to pass the pipe P therethrough. When the pipe P is retained in the pipe holding part 29, the elastic pieces 30 restore to an original shape, so that the free ends hold the pipe P not to come off.

Figure 3:
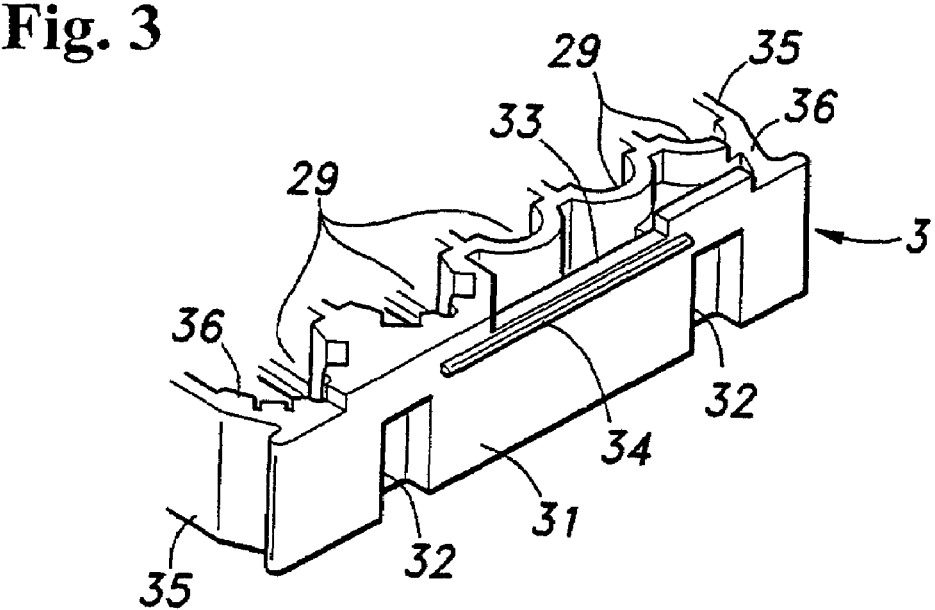
FIG. 3 is an exploded view showing a main portion of a pipe holding portion.

As shown in FIG. 3, two grooves 32 having a rectangular cross section are formed in an upper wall 31 of the pipe holding portion 3 at locations corresponding to the cut portions 20 of the vibration-proof member 4. The grooves 32 have open forward ends and closed rear ends. An engaging portion 33 is formed on a rear edge of the upper wall 31 at a center portion thereof for engaging the rib 22 and the projection 23 of the vibration-proof member 4. A projection 34 is also formed on the rear edge of the upper wall 31 at the center portion thereof for engaging the groove 24 formed along the base portion of the rib 22 of the vibration-proof member 4. Cut portions 36 corresponding to the ribs 27 of the vibration-proof member 4 are formed to extend from left and right ends of the rear edge of the upper wall 31 to rear edges of outer sidewalls 35 of the pipe holding parts 29 located at left and right ends. Cut portions 37 are formed in rear edges of the elastic pieces 30 extending from the outer sidewalls 35 for engaging the projections 28 formed on the ribs 27 of the vibration-proof member 4.

When the connecting portion 2, the pipe holding portion 3, and the vibration-proof member 4 are assembled, the vibration-proof member 4 first covers outside of the pipe holding portion 3 and is attached to the same. The vibration-proof member 4 is relatively easy to deform. Accordingly, the projections 21 formed at the rear ends of the cut portions 20 formed in the upper wall 17 of the vibration-proof member 4 engage the rear ends of the grooves 32 of the pipe holding portion 3. Left and right edges of the upper wall 31 of the pipe holding portion 3 engage the grooves 26 formed at the connecting portions between the upper wall 17 and the sidewalls 18 of the vibration-proof member 4. The ribs 27 formed at the rear edges of the sidewalls 18 of the vibration-proof member 4 abut against rear surfaces of the cut portions 36 of the outer sidewalls 35 of the pipe holding portion 3. The projections 28 are inserted into the cut portions 37 formed in the rear edges of the elastic pieces 30. The engaging portion 33 formed on the upper wall 31 of the pipe holding portion 3 engages the rib 22 and the projection 23 of the vibration-proof member 4. Accordingly, the vibration-proof member 4 is positioned and attached to the pipe holding portion 3.

When a combined body of the vibration-proof member 4 and the pipe holding portion 3 is fitted to a front surface of the housing portion 9 of the connecting portion 2 in the direction D, the elastic pieces 12 of the housing portion 9 deform upwardly so that the vibration-proof member 4 and the pipe holding portion 3 are inserted into the housing portion 9. When the vibration-proof member 4 and the pipe holding portion 3 are fully inserted into the housing portion 9, projecting ends of the elastic pieces 12 engage the rear edges of the cut portions 20 of the vibration-proof member 4. Accordingly, the vibration-proof member 4 and the pipe holding portion 3 are fixed to the housing portion 9.

The vibration-proof member 4 is provided with a plurality of the grooves 19, thereby reducing friction relative to the housing portion 9. As a result, it is easy to insert the vibration-proof member 4 and the pipe holding portion 3 into the housing portion 9. In the embodiment, the grooves 19 are formed in the vibration-proof member 4 in the front-to-rear direction. Alternatively, a plurality of projections may be provided.

The projections 13 formed on the sidewalls 11 of the housing portion 9 engage the grooves 25 formed in the sidewalls 18 of the vibration-proof member 4 to position the vibration-proof member 4 in the vertical direction. The projections 13 and the grooves 25 have different dimensions at left and right sides, thereby assembling the parts properly.

The ribs 22 and 27 of the vibration-proof member 4 abut against the ribs 14 and 15 of the housing portion 9 to position the vibration-proof member 4 in the front-to-rear direction. The projections 16 formed on the rib 15 of the housing portion 9 engage the lower edge of the rib 22 of the vibration-proof member 4 to fix the vibration-proof member 4 in the vertical direction.

In the embodiment, the vibration-proof member 4 is attached to the pipe holding portion 3 first, and then the combined body is attached to the connecting portion 2. The assembly order is not limited to that in the embodiment. The vibration-proof member 4 may be attached to the connecting portion 2 first, and then the pipe holding portion 3 may be inserted into the vibration-proof member 4. In this case, the grooves or projections may be formed in the inner surfaces of the vibration-proof member 4.

According to the present invention, it is possible to provide the pipe clamp having a high force for holding a bar-shaped member and good vibration-proof property without increasing the number of parts and manufacturing steps. The present invention is applicable to a clamp for holding a round bar, a cable and the like in which vibrations are transmitted.

The disclosure of Japanese Patent Application No. 2003-393752, filed on Nov. 25, 2003, is incorporated in the application.

While the invention has been explained with reference to the specific embodiments of the invention, the explanation is illustrative and the invention is limited only by the appended claims.

What is claimed is:

1. A pipe clamp for attaching a pipe to a fixing member, comprising:
   a connecting portion to be attached to the fixing member and formed of a first material,
   a pipe holding portion formed of a second material and attached to the connecting portion for holding the pipe, and
   a vibration-proof member disposed between the connecting portion and the pipe holding portion and formed of a third material, said third material having a rigidity less than those of the first and second materials, said vibration-proof member including a first engaging portion for engaging the connecting portion and a second engaging portion for engaging the pipe holding portion, wherein said vibration-proof member includes a first upper wall, a first groove in the first upper wall, a projection extending rearwardly from the first upper wall at an end of the first groove to engage a part of the pipe holding portion, and a first rib extending rearwardly from a lower side of the first upper wall to engage a lower end of the pipe holding portion.

2. A pipe clamp according to claim 1, wherein said vibration-proof member includes a retaining portion so that the pipe holding portion is inserted into the retaining portion along an axial direction of the pipe, and said connecting portion includes a housing portion so that the vibration-proof member is inserted into the housing portion along the axial direction.

3. A pipe clamp according to claim 2, wherein said vibration-proof member includes a plurality of grooves or projections extending along the axial direction on at least one of a surface facing the connecting portion and a surface facing the pipe holding portion.

4. A pipe clamp for attaching a pipe to a fixing member, comprising:
   a connecting portion to be attached to the fixing member and formed of a first material,
   a pipe holding portion formed of a second material and attached to the connecting portion for holding the pipe, and
   a vibration-proof member disposed between the connecting portion and the pipe holding portion and formed of a third material, said third material having a rigidity less than those of the first and second materials, said vibrationproof member including a first engaging portion for engaging the connecting portion and a second engaging portion for engaging the pipe holding portion, wherein said vibration-proof member is formed of a first upper wall and two first side walls extending rearwardly from two side ends of the first upper wall, and includes at least one first groove in the first upper wall, a projection extending rearwardly from the first upper wall at an end of the at least one first groove, a first rib extending rearwardly from a lower side of the first upper wall, and second ribs formed at the first side walls to face each other at lower sides thereof.

5. A pipe clamp according to claim 4, wherein said pipe holding portion is located inside the vibration-proof member and includes a plurality of pipe holding parts, an upper wall located above the first rib, at least one second groove with a stop formed in the upper wall and disposed above the projection, and outer side walls disposed above the second ribs.

6. A pipe clamp according to claim 5, wherein said connecting portion is formed of a second upper wall and two second side walls extending rearwardly from two side ends of the second upper wall to retain the vibration-proof member therein, and includes at least one craw to sandwich the stop together with the projection, a third rib extending rearwardly from the second upper wall and located under the first rib, and fourth ribs formed at the two second side walls to face each other at lower sides thereof and located under the second ribs.

7. A pipe clamp according to claim 6, wherein said vibration-proof member includes inner grooves at the first side walls to receive lateral ends of the upper wall of pipe holding portion therein, and outer grooves formed at the first side walls to receive projections formed at two second side walls of the connecting portion.

8. A pipe clamp according to claim 1, wherein said connecting portion includes a second upper wall, and a craw to sandwich the part of the pipe holding portion together with the projection.

* * * * *